(12) United States Patent
Watanabe

(10) Patent No.: US 6,853,774 B2
(45) Date of Patent: Feb. 8, 2005

(54) METHOD, DEVICE, AND SYSTEM FOR WAVEFORM SHAPING OF SIGNAL LIGHT

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 343 days.

(21) Appl. No.: 10/093,032

(22) Filed: Mar. 8, 2002

(65) Prior Publication Data

US 2003/0063860 A1 Apr. 3, 2003

(30) Foreign Application Priority Data

Sep. 28, 2001 (JP) ....................................... 2001-301952

(51) Int. Cl.⁷ ............................................... G02B 6/26
(52) U.S. Cl. ............................. 385/39; 385/24; 385/27
(58) Field of Search ............................... 385/11, 15, 24, 385/27, 39, 122–123, 41–42; 359/115–117, 122, 124, 127

(56) References Cited

U.S. PATENT DOCUMENTS

| | | | | |
|---|---|---|---|---|
| 5,307,428 A | * | 4/1994 | Blow et al. .................... | 385/11 |
| 5,500,908 A | * | 3/1996 | Liedenbaum et al. .......... | 385/5 |
| 5,734,665 A |   | 3/1998 | Jeon et al. | |
| 5,760,948 A | * | 6/1998 | Bigo .......................... | 359/326 |
| 5,848,205 A | * | 12/1998 | Bigo .......................... | 385/15 |
| 6,222,959 B1 | * | 4/2001 | Evans ......................... | 385/27 |
| 6,229,937 B1 | * | 5/2001 | Nolan et al. .................. | 385/24 |
| 6,236,779 B1 | * | 5/2001 | Kafka et al. .................. | 385/31 |
| 6,393,167 B1 | * | 5/2002 | Davis et al. ................... | 385/5 |
| 6,424,773 B1 | * | 7/2002 | Watanabe ................... | 385/122 |
| 6,453,082 B1 | * | 9/2002 | Watanabe ..................... | 385/15 |
| 6,587,606 B1 | * | 7/2003 | Evans .......................... | 385/15 |

FOREIGN PATENT DOCUMENTS

| | | | |
|---|---|---|---|
| EP | 0 977 455 A2 | 2/2000 | |
| EP | 1 130 456 A2 | 9/2001 | |
| EP | 0 977 455 A3 | 8/2002 | |
| EP | 1 130 456 A3 | 9/2003 | |
| JP | 409236834 A | * | 9/1997 |

OTHER PUBLICATIONS

Uchiyama, K. et al., "Ultrafast Polarisation–Independent All–Optical Switching Using a Polarisation Diversity Scheme in the Nonlinear Optical Loop Mirror", Electronics Letters, IEE Stevenage, GB, vol. 28, No. 20, Sep. 24, 1992, pp. 1864–1866.

He Yongzhi et al., "Four–wave Mixing and all–optical Switching in a Fiber Loop Mirror Constructed From Two Dispersion–shifted Fibers", Proc. SPIE—Int. Soc. Opt. Eng. (USA), Proceedings of the SPIE—The International Society for Optical Engineering, vol. 4225, Nov. 11, 2000, pp. 53–57.

Yamamoto, T. et al., "Ultrafast Nonlinear Optical Loop Mirror for Demultiplexing 640 Gbit/s TDM Signals", Electronics Letters, IEE Stevenage, GB, vol. 34, No. 10, May 14, 1998, pp. 1013–1014.

Yamada, E. et al., "Subpicosecond Optical Demultiplexing at 10 GHz with Zero–dispersion, Dispersion–flattened Nonlinear Fibre Loop Mirror controlled by 500 fs Gain–switched laser diode", Electronics Letters, IEE Stevenage, GB, vol. 30, No. 23, Nov. 10, 1994, pp. 1966–1968.

Communication mailed by European Patent Office on Mar. 4, 2004 including European Search Report for the corresponding European Patent Application.

* cited by examiner

Primary Examiner—Gregory J. Toatley, Jr.
Assistant Examiner—Sang H. Nguyen
(74) Attorney, Agent, or Firm—Staas & Halsey LLP

(57) ABSTRACT

The method of the present invention comprises the steps of providing a nonlinear optical loop mirror comprising a first optical coupler including first and second optical paths directionally coupled to each other, a loop optical path including first and second fibers having different characteristics for connecting the first and second optical paths, and a second optical coupler including a third optical path directionally coupled to the loop optical path; and supplying probe light and input signal light from the first and third optical paths, respectively, and outputting output signal light from the second optical path.

24 Claims, 17 Drawing Sheets

METHOD, DEVICE, AND SYSTEM FOR WAVEFORM SHAPING OF SIGNAL LIGHT

BACKGROUND OF THE INVENTION

1. Field of the Invention

The present invention relates to a method, device, and system for waveform shaping of signal light.

2. Description of the Related Art

A Mach-Zehnder interferometer (MZI) type optical gate is known as a conventional waveform shaping device for performing waveform shaping on the optical level. This optical gate is configured by integrating a Mach-Zehnder interferometer including first and second nonlinear optical media each for providing a phase shift on an optical waveguide substrate, for example. Probe light as continuous wave (CW) light is equally divided into two components, which are in turn supplied to the first and second nonlinear optical media. The optical path length of the interferometer is set so that output light is not obtained by interference of the two components of the probe light.

An optical signal is further supplied to one of the first and second nonlinear optical media. By properly setting the powers of the optical signal and the probe light, a converted optical signal synchronous with the optical signal is output from the optical gate. The converted optical signal has the same wavelength as that of the probe light.

It has been proposed to use a semiconductor optical amplifier (SOA) as each of the first and second nonlinear optical media. For example, an InGaAs-SOA having end faces treated with antireflection coatings is used as each nonlinear optical medium in a 1.5 $\mu$m band, and these nonlinear optical media are integrated on an InP/GaInAsP substrate to fabricate an optical gate.

A nonlinear optical loop mirror (NOLM) is known as another conventional waveform shaping device. The NOLM includes a first optical coupler including first and second optical paths directionally coupled to each other, a loop optical path for connecting the first and second optical paths, and a second optical coupler including a third optical path directionally coupled to the loop optical path.

By forming a part or the whole of the loop optical path from a nonlinear optical medium and supplying probe light and an optical signal respectively to the first optical path and the third optical path, a converted optical signal is output from the second optical path.

An optical fiber is generally used as the nonlinear optical medium in the NOLM. In particular, a NOLM using a SOA as the nonlinear optical medium is referred to as an SLA-LOM (Semiconductor Laser Amplifier in a Loop Mirror).

In an optical fiber communication system that has been put to practical use in recent years, a reduction in signal power due to transmission line loss, coupling loss, etc. is compensated by using an optical amplifier such as an erbium doped fiber amplifier (EDFA). The optical amplifier is an analog amplifier, which functions to linearly amplify a signal. In this kind of optical amplifier, amplified spontaneous emission (ASE) noise generated in association with the amplification is added to cause a reduction in signal-to-noise ratio (S/N ratio), so that the number of repeaters is limited to result in the limit of a transmission distance. Further, waveform degradation due to the chromatic dispersion owned by an optical fiber and the nonlinear optical effects in the fiber is another cause of the transmission limit. To break down such a limit, a regenerative repeater for digitally processing a signal is required. In particular, an all-optical regenerative repeater capable of performing all kinds of signal processing in optical level is important in realizing a transparent operation independent of the bit rate, pulse shape, etc. of a signal.

The functions required for the all-optical regenerative repeater are amplitude restoration or reamplification, waveform shaping or reshaping, and timing restoration or retiming. These functions are referred to as 3R functions, and in particular, the first and second functions are referred to as 2R functions.

The 2R functions can be provided by combining a waveform shaping device and an optical amplifier, or by using a waveform shaping device having an optical amplifying function. Further, the 3R functions can be provided by additionally using a clock regenerator in parallel to the 2R functions.

The present inventors have already proposed a waveform shaping device for providing the 2R functions and/or the 3R functions (Japanese Patent Application No. Hei 11-293189). In this device, two NOLMs are combined to thereby increase the degree of freedom of wavelength conversion in the case of obtaining a function of waveform shaping or optical gate.

Particularly in the waveform shaping device for providing the 2R functions and/or the 3R functions, there is a case that sufficient 3R functions cannot be obtained according to the degree of deterioration of an optical signal on which the extraction of a clock pulse in the clock regenerator is based.

Further, in the case of applying wavelength division multiplexing (WDM) to dramatically increase a transmission capacity, it is expected that the waveform shaping device for providing the 2R functions and/or the 3R functions may be complicated according to the number of WDM channels. Accordingly, a waveform shaping device suitable for WDM is demanded.

SUMMARY OF THE INVENTION

It is therefore an object of the present invention to provide a method, device, and system for waveform shaping which can obtain sufficient 2R functions and/or 3R functions.

It is another object of the present invention to provide a method, device, and system for waveform shaping which are suitable for WDM.

In accordance with an aspect of the present invention, there is provided a method including the steps of providing a nonlinear optical loop mirror including a first optical coupler including first and second optical paths directionally coupled to each other, a loop optical path including first and second fibers having different characteristics for connecting the first and second optical paths, and a second optical coupler including a third optical path directionally coupled to the loop optical path; and supplying probe light and input signal light from the first and third optical paths, respectively, and outputting output signal light from the second optical path.

In accordance with another aspect of the present invention, there is provided a device comprising a first optical coupler including first and second optical paths directionally coupled to each other; a loop optical path including first and second fibers having different characteristics for connecting the first and second optical paths; and a second optical coupler including a third optical path directionally coupled to the loop optical path; probe light and input signal light being supplied from the first and third optical paths, respectively; output signal light being output from the second optical path.

In accordance with a further aspect of the present invention, there is provided a system including a first optical fiber transmission line for propagating signal light; a nonlinear optical loop mirror connected to the first optical fiber transmission line for converting the signal light into converted light; and a second optical fiber transmission line connected to the nonlinear optical loop mirror for propagating the converted light. The nonlinear optical loop mirror is provided by the device according to the present invention.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
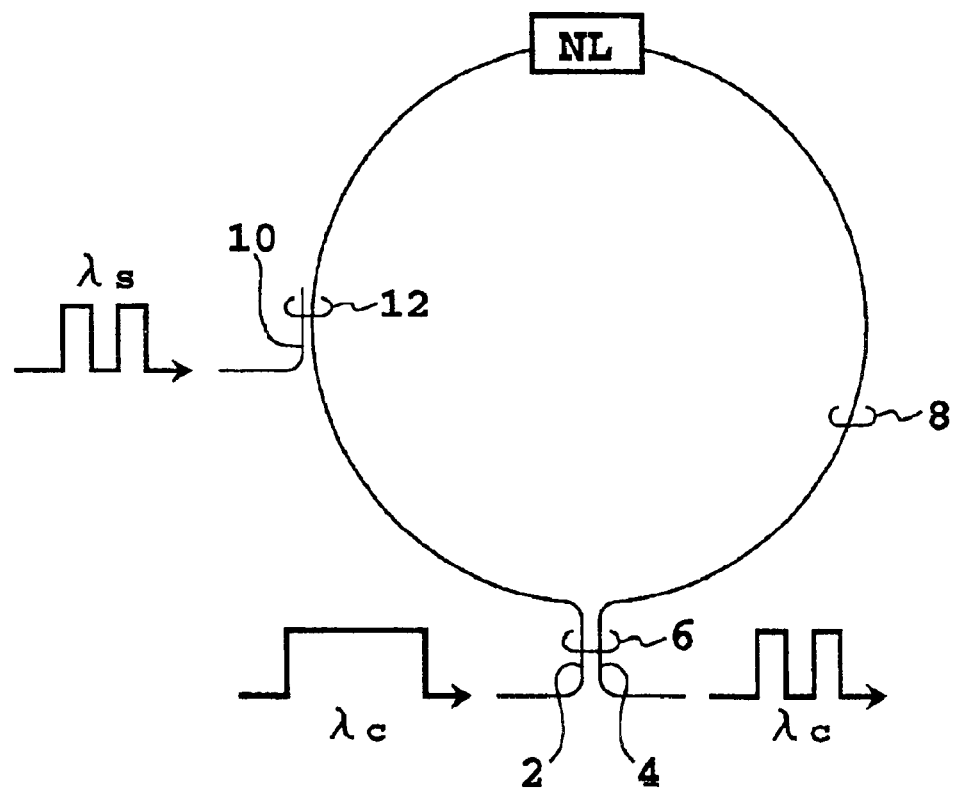
FIG. 1 is a diagram showing a configuration of a NOLM (nonlinear optical loop mirror) applicable to the present invention.

Some preferred embodiments of the present invention will now be described in detail with reference to the attached drawings. Throughout the drawings, substantially the same or like parts are denoted by the same reference numerals.

Referring to FIG. 1, there is shown a configuration of a NOLM (nonlinear optical loop mirror) applicable to the present invention. This NOLM includes a first optical coupler 6 including first and second optical paths 2 and 4 directionally coupled to each other, a loop optical path 8 for connecting the first and second optical paths 2 and 4, and a second optical coupler 12 including a third optical path 10 directionally coupled to the loop optical path 8.

A part or the whole of the loop optical path 8 is provided by a nonlinear optical medium NL. The coupling ratio of the first optical coupler 6 is set substantially to 1:1.

The operation of this NOLM will now be described in brief. When probe light having a wavelength $\lambda_c$ is input into the first optical path 2 of the optical coupler 6 and an optical signal having a wavelength $\lambda_s$ is input into the third optical path 10 of the optical coupler 12, a converted optical signal having a wavelength $\lambda_c$ is output from the second optical path 4 of the optical coupler 6. The probe light may be continuous-wave (CW) light or optical pulses. In this example shown, the probe light is CW light.

The probe light is divided into two components having the same power by the optical coupler 6. The two components propagate in the loop optical path 8 clockwise and counterclockwise, respectively, with exactly the same optical path length, and are next subjected to a phase shift $\phi$ for each by the nonlinear optical medium NL. Thereafter, they are combined by the optical coupler 6. In combining these components at the optical coupler 6, they are equal in power and phase to each other, so that resultant light obtained by this combination is output from the first optical path 2 but not output from the second optical path 4 as if it is reflected by a mirror.

When an optical signal is input from the middle of the loop optical path 8 by the optical coupler 12, this optical signal propagates in the loop optical path 8 in only one direction thereof (e.g., clockwise in FIG. 1), and the nonlinear refractive index of the nonlinear optical medium NL changes for the light propagating in this direction only when on-pulses pass therethrough. Accordingly, in combining the two components of the probe light at the optical coupler 6, the phases of the two components of the probe light at their portions synchronous with off-pulses of the optical signal are coincident with each other, and the phases of the two components of the probe light at their portions synchronous with on-pulses of the optical signal are different from each other. Letting $\Delta\phi$ denote a phase difference in the latter case, an output proportional to $\{1-\cos(\Delta\phi)\}$ is obtained from the second optical path 4 of the optical coupler 6.

By setting the power of the input optical signal so that the phase difference becomes $\pi$, it is possible to perform a switching operation such that the two components combined upon passing of the on-pulses are output only from the second optical path 4. Thus, the conversion, from the optical signal having the wavelength $\lambda_s$ into the converted optical signal having the wavelength $\lambda_c$ is performed. That is, wavelength conversion is performed on the data of the optical signal.

Assuming that an optical Kerr effect (cross-phase modulation (XPM) by the optical signal and the probe light) is used as the nonlinear optical effect, the phase shift $\Delta\phi$ is proportional to $\gamma PL$, where $\gamma$ is the nonlinear coefficient of the nonlinear optical medium NL, P is the optical power in the nonlinear optical medium NL, and L is the length of interaction of the optical Kerr effect in the nonlinear optical medium NL.

Figure 2:
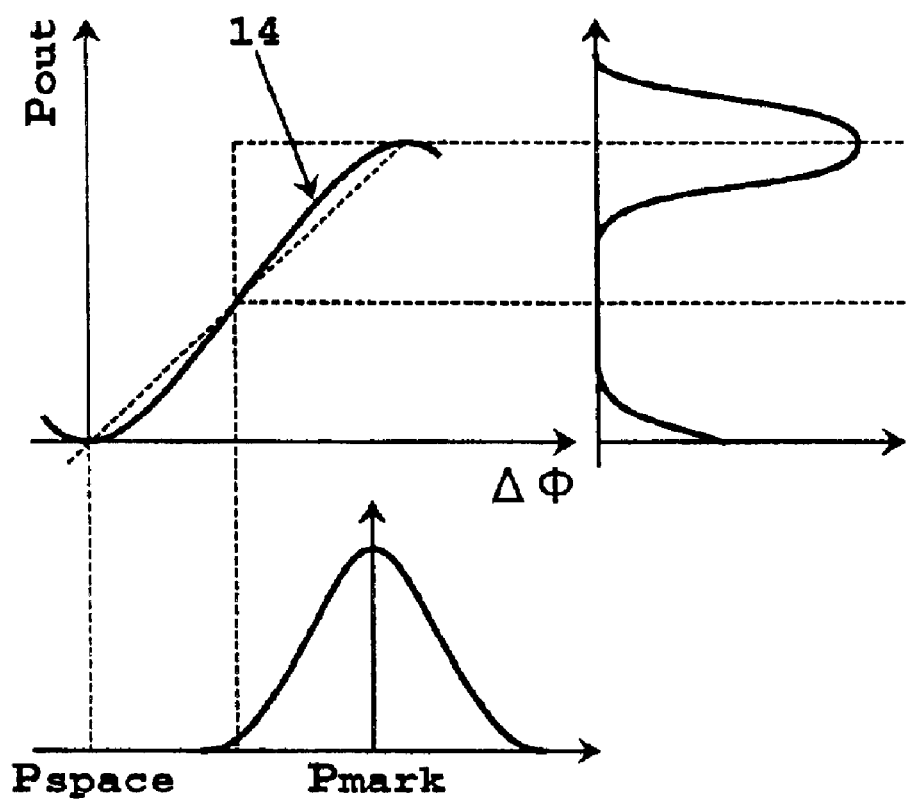
FIG. 2 is a graph showing the output characteristic of the NOLM with respect to a phase difference $\Delta\phi$.

FIG. 2 is a graph showing the output characteristic of the NOLM with respect to the phase difference $\Delta\phi$. In a main part of this graph, the vertical axis represents the power Pout of the converted optical signal output from the second optical path 4, and the horizontal axis represents the phase difference $\Delta\phi$. In the cosine curve depicted by reference numeral 14, the phase difference $\Delta\phi$ giving a minimum value corresponds to 0, and the phase difference $\Delta\phi$ giving a maximum value corresponds to $\pi$. Accordingly, by making the "0" level (Pspace) and the "1" level (Pmark) of the input optical signal respectively correspond to 0 and $\pi$ of the phase difference $\Delta\phi$, noise accompanying the input optical signal can be suppressed. This is due to the fact that the conversion in accordance with $\{1-\cos(\Delta\phi)\}/2$ exhibits a saturable characteristic near the leading edge or the peak of each pulse unlike linear amplification conversion.

A typical example of the nonlinear optical medium NL in the NOLM is an optical fiber. A dispersion shifted fiber (DSF) is mainly used as the optical fiber used in the NOLM, and its length is usually several km. Further, a NOLM using an SOA (semiconductor optical amplifier) as the nonlinear optical medium NL has also been proposed (SLALOM).

The SOA type NOLM is superior in compactness and integration. However, it has disadvantages such that the signal-to-noise (S/N) ratio upon the conversion is reduced by the influence of amplified spontaneous emission (ASE) noise added from the SOA and that speed limitation is caused by a carrier effect.

On the other hand, the fiber type NOLM has an advantage such that the response time of the third-order nonlinear optical effect in the fiber is very short as on the order of femto-seconds. However, since a long fiber is required, high-precision dispersion management is necessary to eliminate speed limitation. The fiber type NOLM has other problems such that it is difficult to cope with the dependence of an input optical signal upon a polarization state and with polarization fluctuations in the loop.

The present inventor proposed a compact NOLM using a highly nonlinear dispersion shifted fiber (HNL-DSF) in Japanese Patent Application No. Hei 10-176316. The present invention mainly provides a high-performance waveform shaping device configured by cascading a plurality of NOLMs each similar to that proposed above by the present inventor to realize optical signal processing such as optical 2R by using this waveform shaping device.

As a nonlinear optical effect applicable to optical signal processing in an optical communication system, it is considered to apply an optical Kerr effect such as three-wave mixing in a second-order nonlinear optical medium or self-phase modulation (SPM), cross-phase modulation (XPM), and four-wave mixing (FWM) in a third-order nonlinear optical medium. Examples of the second-order nonlinear optical medium include InGaAs and $LiNbO_3$. Examples of the third-order nonlinear optical medium include an optical fiber and a semiconductor medium such as a semiconductor optical amplifier (SOA), a distributed feedback laser diode (DFB-LD), and photonic crystals and nano devices.

In particular, the present invention may employ an optical Kerr effect in an optical fiber. A single-mode fiber is suitable as the optical fiber, and especially a dispersion-shifted fiber (DSF) having a relatively small chromatic dispersion is preferable.

In general, the third-order nonlinear coefficient $\gamma$ of an optical fiber is expressed as follows:

$$\gamma = \omega n_2 / c A_{eff} \quad \quad (1)$$

where $\omega$ is the optical angular frequency, c is the velocity of light in a vacuum, and $n_2$ and $A_{eff}$ are the nonlinear refractive index and the effective core area of the optical fiber, respectively.

The nonlinear coefficient $\gamma$ of a conventional DSF is as small as about 2.6 $W^{-1}$ $km^{-1}$, so a fiber length of several km to 10 km or more is necessary to obtain sufficient conversion efficiency. If a shorter DSF can be used to realize sufficient conversion efficiency, the zero-dispersion wavelength can be managed with high accuracy, thereby realizing high-speed and wide-band conversion.

In general, for enhancement of the third-order nonlinear effect of an optical fiber, it is effective to increase the nonlinear refractive index $n_2$ in Eq. (1) or to increase a light intensity by reducing a mode field diameter (MFD) corresponding to the effective core area $A_{eff}$ in Eq. (1).

The nonlinear refractive index $n_2$ can be increased by doping the cladding with fluorine or the like or by doping the core with a high concentration of $GeO_2$, for example. By doping the core with 25 to 30 mol % of $GeO_2$, a large value of $5\times10^{-20}$ $m^2/W$ or more (about $3.2\times10^{-20}$ $m^2/W$ for a usual silica fiber) can be obtained as the nonlinear refractive index $n_2$.

On the other hand, the MFD can be reduced by designing a relative refractive-index difference $\Delta$ between the core and the cladding or by designing the core shape. Such design of a DSF is similar to that of a dispersion compensating fiber (DCF). For example, by doping the core with 25 to 30 mol % of $GeO_2$ and setting the relative refractive-index difference $\Delta$ to 2.5 to 3.0%, a small value of less than 4 $\mu$m can be obtained as the MFD. Owing to the combined effects of increasing the nonlinear refractive index $n_2$ and reducing the MFD, an optical fiber (HNL-DSF) having a large value of 15 $W^{-1}$ $km^{-1}$ or more as the nonlinear coefficient $\gamma$ can be obtained.

As another important factor, the HNL-DSF having a large nonlinear coefficient $\gamma$ as mentioned above has a zero dispersion in a wavelength band used. This point can also be satisfied by setting each parameter in the following manner. That is, in general, a dispersion in a usual DCF increases in a normal dispersion region with an increase in refractive index difference $\Delta$ under the condition that the MFD is set constant. On the other hand, the dispersion decreases with an increase in core diameter, whereas the dispersion increases with a decrease in core diameter. Accordingly, the dispersion can be reduced to zero by increasing the core diameter under the condition that the MFD is set to a certain value in a wavelength band used.

Recently, research and development have been pursued on a single-mode fiber called a photonic crystal fiber or Holly fiber fabricated from a preform having a form of multicore fiber. With this kind of fiber, a smaller MFD (mode field diameter) can be realized, and such a fiber is also applicable to the present invention. Such an optical fiber exhibiting greater nonlinear effects than the normal optical fiber, including the photonic crystal fiber, will be hereinafter referred to as an HNL-DSF.

A phase shift due to the optical Kerr effect in an optical fiber having a length L is proportional to $\gamma P_p L$ where $P_p$ is the average pump light power. Accordingly, the fiber having a nonlinear coefficient $\gamma$ of 15 $W^{-1}$ $km^{-1}$ can achieve the same conversion efficiency as that by a usual DSF even when the fiber length is reduced to about $2.6/15 \approx 1/5.7$ as compared with the usual DSF. As mentioned above, the usual DSF requires a length of about 10 km for sufficient conversion efficiency. To the contrary, the HNL-DSF having a large nonlinear coefficient $\gamma$ as mentioned above can obtain a similar effect with a reduced length of about 1 to 2 km. Practically, loss in the fiber is reduced in an amount corresponding to a decrease in fiber length, so that the fiber can be further shortened to obtain the same efficiency. Thus in a short fiber, controllability of the zero-dispersion wavelength can be improved, and ultra wide-band conversion can be achieved as will be hereinafter described. Further, when the fiber length is several km, polarization can be fixed, that is, a polarization maintaining ability can be ensured. Therefore, application of the HNL-DSF to the present invention is greatly effective in achieving high conversion efficiency and wide conversion band and removing polarization dependence.

To effectively produce an optical Kerr effect, especially XPM by using an optical fiber and improve the efficiency of conversion from the optical signal into the converted optical signal, phase matching between the probe light and the optical signal must be achieved. The phase matching will now be described with reference to FIG. 3.

Figure 3:
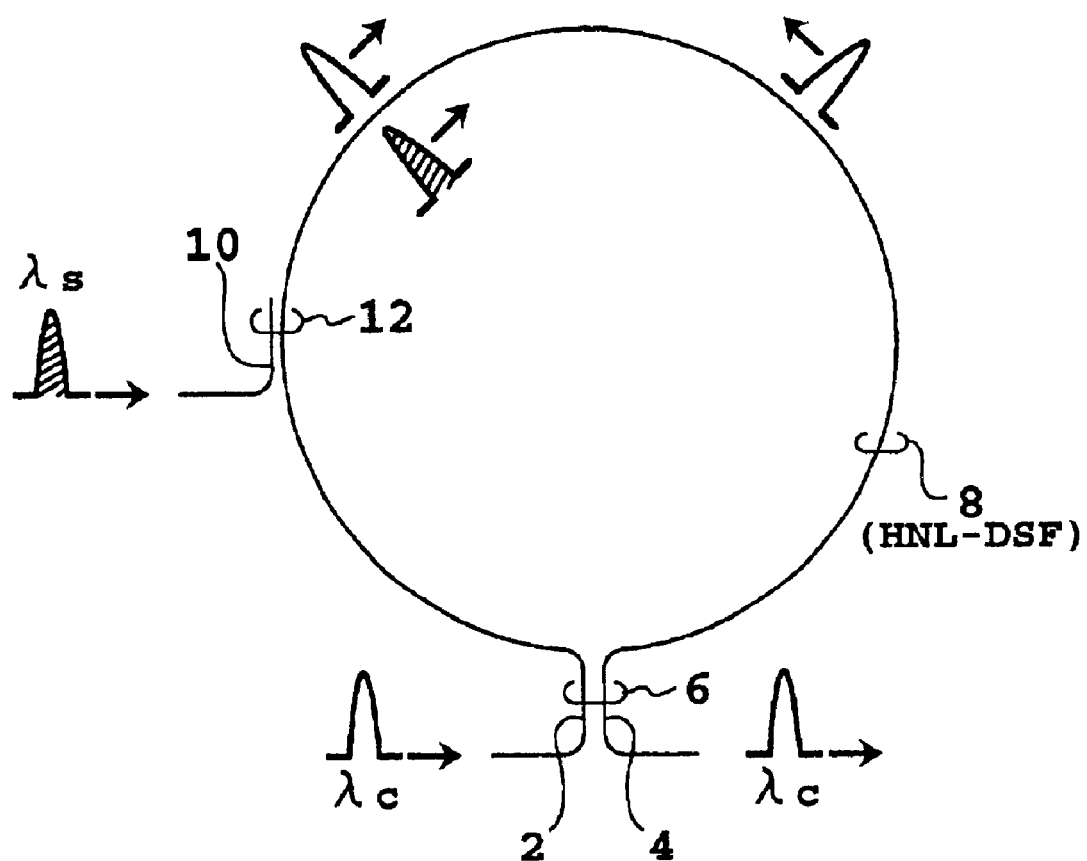
FIG. 3 is a diagram for illustrating phase matching in the NOLM.

FIG. 3 is a diagram for illustrating the phase matching in the NOLM. It is now assumed that both the probe light having a wavelength $\lambda_c$ supplied to the optical path 2 and the optical signal having a wavelength $\lambda_s$ supplied to the optical path 10 are optical pulses. The optical pulses as the probe light are branched to first probe pulses propagating clockwise in the loop optical path 8 and second probe pulses propagating counterclockwise in the loop optical path 8 by the optical coupler 6. The optical pulses as the optical signal are passed through the optical coupler 12 and propagate clockwise as signal pulses in the loop optical path 8.

A phase matching condition in the loop optical path 8 is given by timing coincidence of the signal pulses and the first probe pulses both propagating clockwise in the loop optical path 8. If the timing coincidence of the signal pulses and the first probe pulses is not achieved, optical Kerr shift by XPM is limited to cause a difficulty of effective switch operation or gate operation.

Since the wavelength of the signal pulses and the wavelength of the first probe pulses are different from each other, the group velocity of the signal pulses and the group velocity of the first probe pulses are different from each other, resulting in occurrence of timing deviation proportional to the length of the loop optical path 8 (walk-off). To avoid this possibility, wavelength location is preferably selected so that the group velocity of the signal pulses and the first probe pulses become equal to each other.

The most effective wavelength location for minimizing the timing deviation is obtained by locating the wavelength of the signal pulses and the wavelength of the first probe pulses in substantially symmetrical relationship with respect to the zero-dispersion wavelength of the loop optical path 8. Over a wide band near the zero-dispersion wavelength, the chromatic dispersion changes substantially linearly, so that a good phase matching condition can be obtained by making the group velocities of the signal pulses and the first probe pulses coincide with each other by the above-mentioned wavelength location.

Thus according to an aspect of the present invention, the phase matching condition can be obtained by satisfying the relation of $\lambda_s+\lambda_c=2\lambda_0$ where $\lambda_0$ is the zero-dispersion wavelength of the loop optical path, thus improving the efficiency of conversion from the optical signal into the converted optical signal.

However, if there are variations in the zero-dispersion wavelength itself along the fiber, the group velocities become different from each other in spite of the above wavelength location, causing a limit to a conversion band and a convertible signal rate. Thus, a conversion band by the fiber is limited by dispersion. If dispersion along the fiber is perfectly controlled, for example, if a fiber having a zero-dispersion wavelength uniform over the entire length (exactly, the nonlinear length) is fabricated, a conversion band infinite in fact (unlimitedly wide in a range where the wavelength dependence of dispersion is linear) could be obtained by locating the wavelengths of the probe light and the optical signal in symmetrical relationship with respect to this uniform zero-dispersion wavelength. Actually, however, the zero-dispersion wavelength varies along the fiber, causing a deviation of the phase matching condition from an ideal condition to result in a limit of the conversion band.

A first method for realizing a wide conversion band is to use an HNL-DSF as a part or the whole of the loop optical path 8. In the case that the HNL-DSF is used, sufficient conversion can be achieved with a length of about 1 to 2 km, so that dispersion controllability can be improved to easily obtain a wide-band characteristic. In particular, by suppressing variations in the zero-dispersion wavelength near an input end where the efficiency of production of an optical Kerr effect is high, the conversion band can be widened most efficiently. Further, by cutting the fiber into a plurality of small sections and next joining any of the small sections similar in zero-dispersion wavelength by splicing or the like (in an order different from the initial order counted from a fiber end), a wide conversion band can be obtained although an average dispersion over the entire length is unchanged.

Alternatively, many fibers each having a length (e.g., hundreds of meters or less) allowing high-accuracy dispersion control required to obtain a sufficiently wide conversion band may be prepared in advance, and any of these fibers having a required zero-dispersion wavelength may be combined to be spliced, thereby fabricating a fiber having a length required to obtain a required conversion efficiency.

In the case of widening the conversion band as mentioned above, it is effective to gather the sections of the fiber having less variations in zero-dispersion wavelength near an input end (e.g., both ends of a nonlinear optical medium) where the light intensity is high. Further, the conversion band can be further widened by increasing the number of sections of the fiber as required, or by alternately arranging the positive and negative signs of dispersion at a relatively large-dispersion portion separate from the input end to thereby suitably combine the small sections.

The degree of reducing the length of each section in cutting the optical fiber may be based on the nonlinear length, for example. The phase matching in a third-order nonlinear effect in a fiber sufficiently shorter than the nonlinear length may be considered to depend on the average dispersion of the fiber. As an example, in a third-order nonlinear effect using a pump light power of about 30 mW in a fiber having a nonlinear coefficient $\gamma$ of 2.6 $W^{-1}$ $km^{-1}$, the nonlinear length is about 12.8 km. In this example, the length of each section is set to about 1/10 of 12.8 km, i.e., about 1 km. As another example, in a third-order nonlinear effect using a pump light power of about 30 mW in a fiber having a nonlinear coefficient $\gamma$ of 15 $W^{-1}$ $km^{-1}$, the nonlinear length is about 2.2 km. In this example, the length of each section is set to about 1/10 of 2.2 km, i.e., about 200 m. In any case, a wide conversion band can be obtained by measuring an average zero-dispersion wavelength of fiber sections each sufficiently shorter than the nonlinear length and combining any of the fiber sections having almost the same zero-dispersion wavelength to thereby configure a fiber achieving a required conversion efficiency.

Additional information on such a method of broadening the band of FWM by a fiber is described in detail in Japanese Patent Application No. Hei 10-176316.

However, if the power of pump light, signal light, or converted light exceeds a threshold value of stimulated Brillouin scattering (SBS) in the fiber, the efficiency of production of XPM (cross-phase modulation) is reduced. To suppress the effect of SBS, the pump light or signal light is subjected to frequency modulation or phase modulation. In such modulation, a modulating rate of hundreds of kHz is good enough, and in the case that the signal light is a high-speed signal having a signal rate on the order of Gb/s, the modulation has almost no adverse effect on the signal light.

The operation of the NOLM shown in FIG. 1 requires maintaining the polarization state of the probe light in the loop optical path 8. That is, after the two components of the probe light separated by the optical coupler 6 propagate in the loop optical path 8 clockwise and counterclockwise, the two components must be returned to the optical coupler 6 in the same polarization state.

By using the HNL-DSF, the loop optical path 8 can be configured with a short length enough to maintain the polarization state. For example, the polarization state in the loop optical path 8 can be adjusted by using a polarization controller.

Basically, the polarization state of the optical signal is desirably made substantially coincident with the polarization state of the probe light. However, the polarization states of the optical signal and the probe light may be influenced by polarization mode dispersion or the like in the fiber. Accordingly, it is desirable to optimize the polarization states of the optical signal and the probe light so that the power of the output light becomes maximum.

Figure 4A:
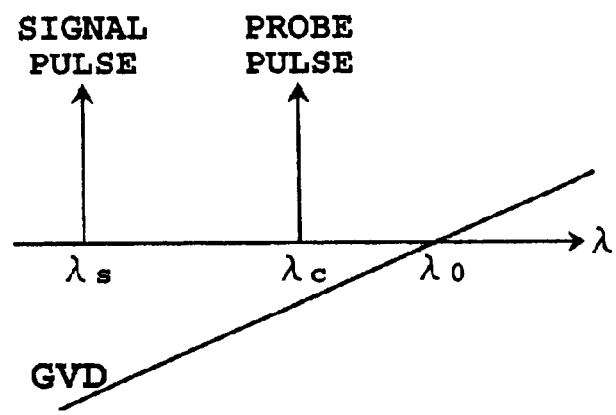
FIGS. 4A and 4B are diagrams for illustrating examples of the location of the wavelengths of signal pulses and probe pulses.
Figure 4B:
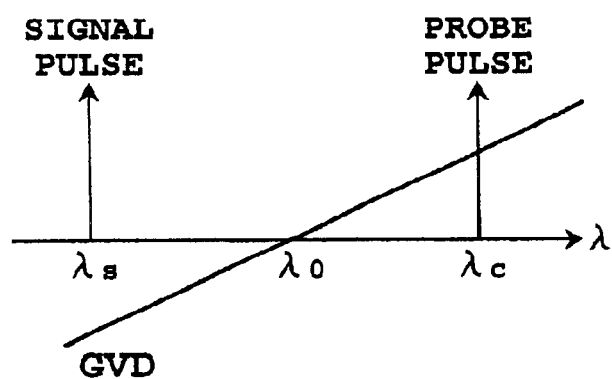

Referring to FIGS. 4A and 4B, there are shown examples of the relation among the wavelengths of signal pulses (signal light) and probe pulses (probe light) and the zero-dispersion wavelength $\lambda_0$ of the loop optical path 8. In the case that short pulses having a pulse width of several picoseconds to subpicoseconds in a NOLM as shown in FIG. 3, it is desirable to minimize a temporal deviation (walk-off) between the signal pulses and the probe pulses, so as to efficiently generate XPM (cross-phase modulation).

In the case that relatively low-speed pulses having a width of 10 ps or more are used in a highly nonlinear fiber such as an HNL-DSF, a π phase shift can be obtained with a relatively short distance (about 1 km). Accordingly, it is not so necessary to pay attention to fiber dispersion to both the signal pulses and the probe pulses as shown in FIG. 4A.

However, in the case of using short pulses as applied in the present invention, the efficiency of generation of XPM is extremely lowered by a slight difference in dispersion, resulting in the need for very high signal power.

One method for solving this problem is to symmetrically locate the wavelength $\lambda_s$ of the signal pulses and the wavelength $\lambda_c$ of the probe pulses with respect to the zero-dispersion wavelength $\lambda_0$ as shown in FIG. 4B. In this case, the group velocity dispersions (GVDs) of the signal pulses and the probe pulses become substantially equal to each other, thereby allowing the most efficient generation of XPM.

However, the dispersion in a fiber having a length of about 1 km, though it is short, is not constant, but subtly changes in the longitudinal direction of the fiber. Further, when the wavelength location shown in FIG. 4B is set, the relation among the wavelengths is limited, resulting in limitations to the range of application.

Figure 6A:
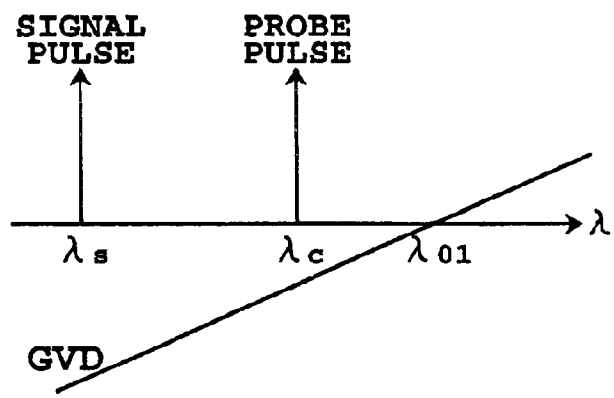
FIGS. 6A and 6B are diagrams for illustrating an example of the location of the wavelengths of signal pulses and probe pulses according to the present invention.
Figure 6B:
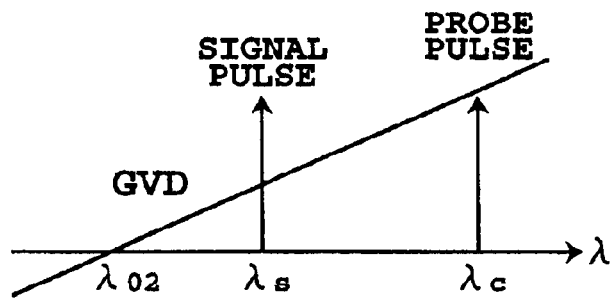

To solve this problem, dispersion compensation is also employed in the present invention. For example, by combining a fiber such that the wavelengths of the signal pulses and the probe pulses are located in the normal dispersion region as shown in FIG. 6A and a fiber such that the wavelengths of the signal pulses and the probe pulses are located in the anomalous dispersion region as shown in FIG. 6B, the walk-off can be reduced to allow the efficient generation of XPM as will be hereinafter described.

Figure 5:
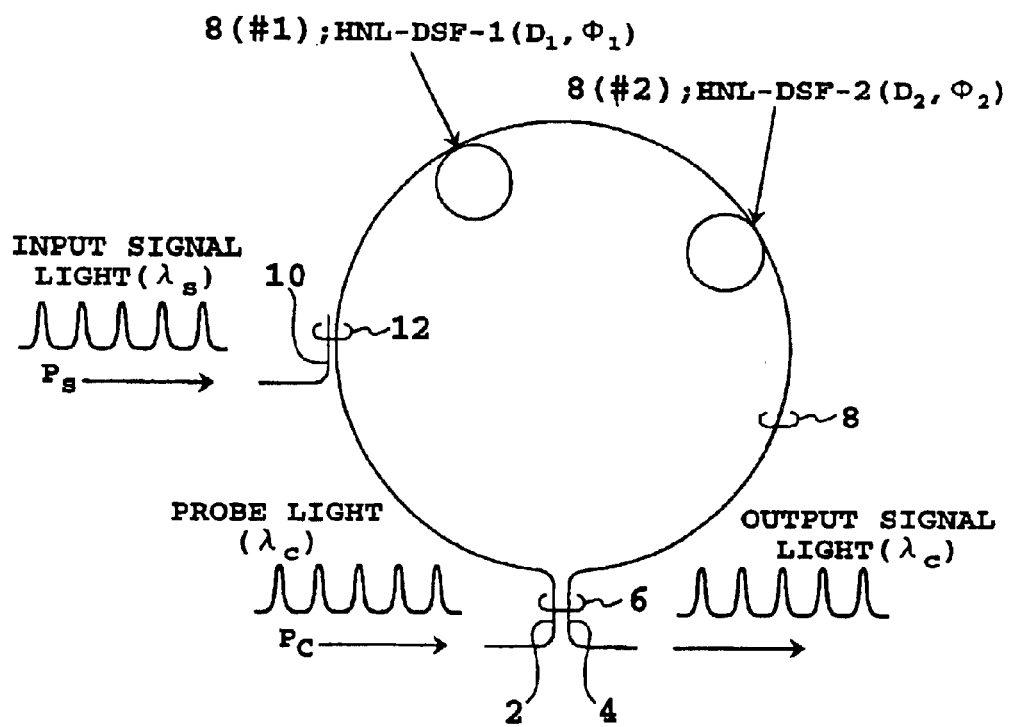
FIG. 5 is a diagram showing a first preferred embodiment of the device according to the present invention.

FIG. 5 is a diagram showing a first preferred embodiment of the device according to the present invention. This device includes a first optical coupler 6 including first and second optical paths 2 and 4 directionally coupled to each other, a loop optical path 8 for connecting the first and second optical paths 2 and 4, and a second optical coupler 12 including a third optical path 10 directionally coupled to the loop optical path 8.

The coupling ratio of the first optical coupler 6 is set substantially to 1:1. A part or the whole of the loop optical path 8 is provided by a nonlinear optical medium. More specifically, the loop optical path 8 is provided by splicing two fibers 8(#1) and 8(#2) each configured by an HNL-DSF in this preferred embodiment, so as to obtain a wide conversion band and the above-mentioned additional effects.

Probe light having a wavelength $\lambda_c$ and a power $P_c$ is supplied to the first optical path 2. Input signal light having a wavelength $\lambda_s (\neq \lambda_c)$ and a power $P_s$ is supplied to the third optical path 10. As a result, output signal light having the wavelength $\lambda_c$ and synchronous with the input signal light is output from the second optical path 4.

Probe light may be CW light or clock pulses having a frequency equal to or different from the bit rate of the input optical signal and synchronous with the input optical signal.

In the preferred embodiment shown in FIG. 5, an HNL-DSF is used as the loop optical path 8. The dispersion of the HNL-DSF can be suitably optimized according to the bit rate or pulse shape of signal light. For example, in the case of a high-bit-rate signal using short pulses, the dispersion is preferably set so that the walk-off between two pulses (refer to the previous description with reference to FIG. 2) does not occur. As an example, it is considered to arrange the zero-dispersion wavelength of the HNL-DSF near the intermediate between the wavelength of the signal light and the wavelength of the probe light as mentioned above. In this case, the two pulses have substantially the same group velocity, so that the walk-off can be minimized. Further, the determination of which of the signal light wavelength and the probe light wavelength is to be arranged in a normal dispersive region and the other is to be arranged in an anomalous dispersive region may be suitably optimized according to the characteristics.

Alternatively, the zero-dispersion wavelength may be set longer or shorter than the wavelengths of the two pulses. In this case, the walk-off cannot be minimized. However, the following merits can be obtained. In the case of setting the zero-dispersion wavelength to a longer wavelength, both the signal light wavelength and the probe light wavelength fall in the normal dispersive region, so that a modulation instability effect can be suppressed. Conversely, in the case of setting the zero-dispersion wavelength to a shorter wavelength, both the signal light wavelength and the probe light wavelength fall in the anomalous dispersive region, so that a pulse compression effect can be used. Such setting of the zero-dispersion wavelength may be determined according to actual system conditions.

In the preferred embodiment shown in FIG. 5, the loop optical path 8 is configured from an HNL-DSF. In the HNL-DSF, its third-order nonlinear coefficient can be increased 5 to 10 times that of a conventional DSF, so that the product of the length and the optical power required to set the phase difference $\Delta\phi$ to $\pi$ can be reduced to $\frac{1}{5}$ to $\frac{1}{10}$. Accordingly, a required length for the same signal power can also be reduced to $\frac{1}{5}$ to $\frac{1}{10}$, with the result that a sufficient characteristic can be obtained with a reduced length of 1 km or less. As a result, it is possible to provide a NOLM which can suppress a signal rate limit due to chromatic dispersion, can eliminate the polarization dependence of an input optical signal, and can eliminate the need for measures against polarization fluctuations in the loop optical path 8.

Thus according to an aspect of the present invention, each loop optical path 8 is provided by an optical fiber as a nonlinear optical medium. The optical fiber has a nonlinear coefficient large enough to reduce the length of the optical fiber to such an extent that the optical fiber has a polarization plane preserving ability. Accordingly, the polarization dependence of an input optical signal can be reduced. Alternatively, a polarization maintaining fiber as the optical fiber providing each loop optical path 8 may be used for the same purpose.

In the preferred embodiment shown in FIG. 5, the dispersions of the fibers 8(#1) and 8(#2) are $D_1$ and $D_2$, respectively, and the phase shifts by XPM in the fibers 8(#1) and 8(#2) are $\phi_1$ and $\phi_2$, respectively. By setting the dispersions $D_1$ and $D_2$ and the phase shifts $\phi_1$ and $\phi_2$ so that $\phi_1+\phi_2=\pi$ and that $D_1$ and $D_2$ are compensated each other, it is possible to provide a NOLM which can reduce the influence of the walk-off and the influence of the pulse shape degradation due to fiber dispersion.

FIGS. 6A and 6B show an example wherein $D_1$ and $D_2$ have the same sign and the fibers 8(#1) and 8(#2) have different zero-dispersion wavelengths $\lambda_{01}$ and $\lambda_{02}$, respectively. That is, the zero-dispersion wavelength $\lambda_{01}$ of the fiber 8(#1) is set longer than the wavelengths $\lambda_s$ and $\lambda_c$ of the signal pulses and the probe pulses, and the zero-dispersion wavelength $\lambda_{02}$ of the fiber 8(#2) is set shorter than the wavelengths $\lambda_s$ and $\lambda_c$ of the signal pulses and the probe pulses.

Figure 7A:
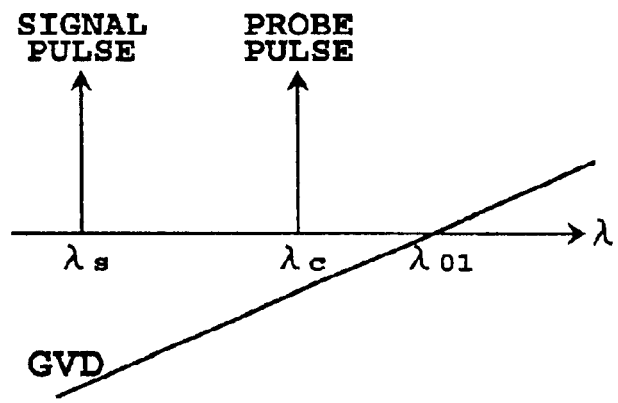
FIGS. 7A and 7B are diagrams for illustrating another example of the location of the wavelengths of signal pulses and probe pulses according to the present invention.
Figure 7B:
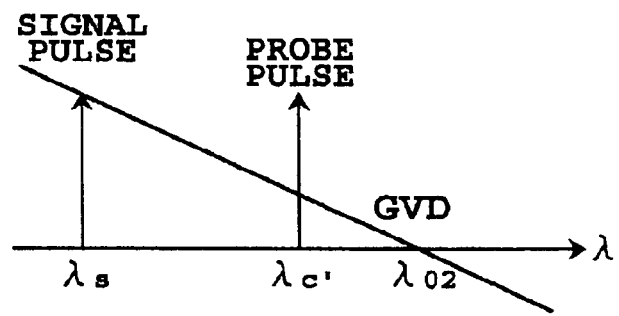

FIGS. 7A and 7B show another example wherein the zero-dispersion wavelengths $\lambda_{01}$ and $\lambda_{02}$ are set substantially equal to each other and $D_2=-D_1$. Thus, the loop optical path 8 is obtained by combining two fibers whose dispersions and dispersion slopes are opposite in sign, thereby substantially completely compensating the dispersion both to the signal pulses and to the probe pulses. Accordingly, it is possible to provide a NOLM reduced in the walk-off and in the pulse shape degradation. Furthermore, XPM can be generated very efficiently.

Figure 8:
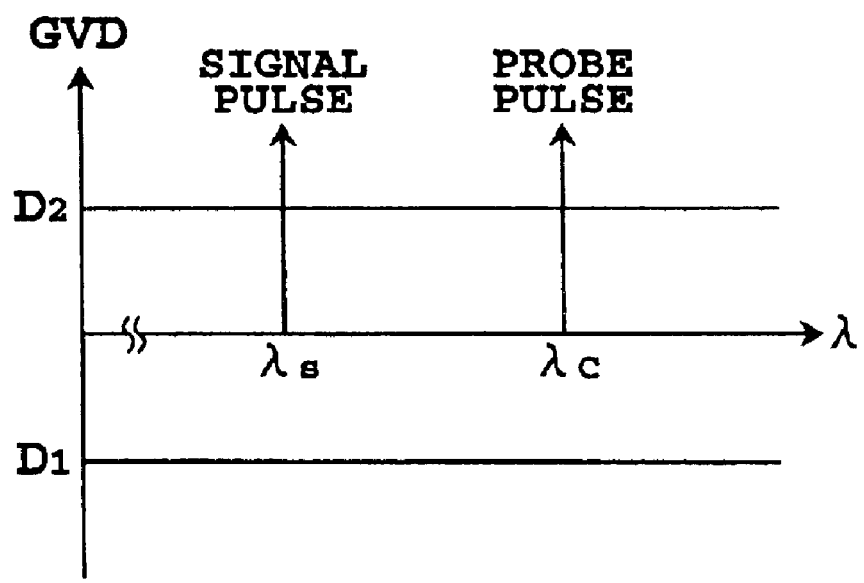
FIG. 8 is a diagram for illustrating a further example of the location of the wavelengths of signal pulses and probe pulses according to the present invention.

As another example in FIG. 8, the fibers 8(#1) and 8(#2) may be provided by dispersion flattened fibers (DFFs) having dispersions opposite in sign and equal in absolute value. In this case, the wavelength location of the signal light and the probe light can be arbitrarily set.

Figure 9:
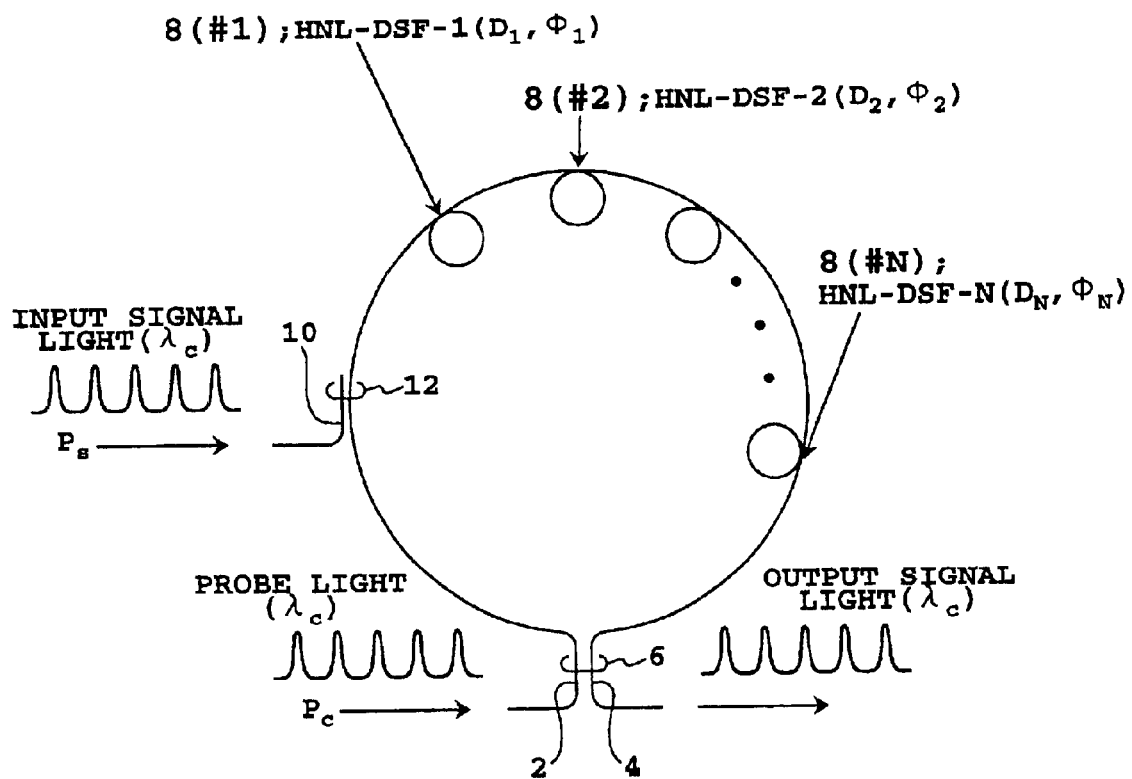
FIG. 9 is a diagram showing a second preferred embodiment of the device according to the present invention.

FIG. 9 is a diagram showing a second preferred embodiment of the device according to the present invention. In this preferred embodiment, the loop optical path 8 is configured by connecting N fibers 8(#1) to 8(#N) (N is an integer greater than 2). The dispersions of the fibers 8(#1) to 8(#N) are $D_1$ to $D_N$, respectively, and the phase shifts by XPM in the fibers 8(#1) to 8(#N) are $\phi_1$ to $\phi_N$, respectively. By setting the dispersions $D_1$ to $D_N$ and the phase shifts $\phi_1$ to $\phi_N$ so that $\phi_1+\phi_2+\ldots+\phi_N=\pi$ and $D_1+D_2+\ldots+D_N=0$, higher-precision dispersion compensation can be performed to allow the processing of higher-speed optical pulses.

Figure 15:
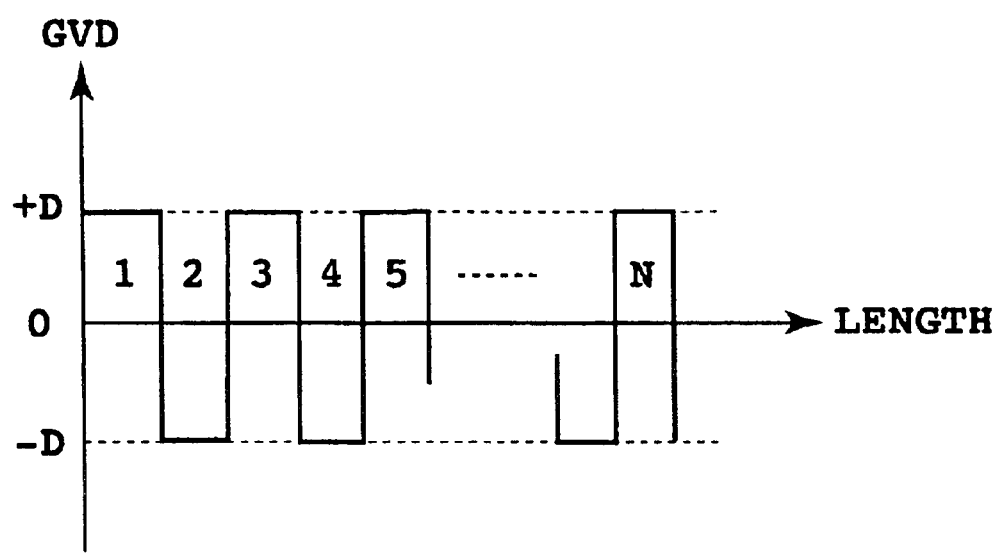
FIG. 15 is a diagram for illustrating an example of dispersion compensation such that large dispersions having different signs are alternately arranged.

Particularly, by setting the value of each dispersion to a relatively large value and alternately arranging the large dispersions opposite in sign (+D and −D) to compensate the dispersions each other as shown in FIG. 15, it is possible to provide an ideal NOLM eliminating all the limitation factors such as waveform distortion, walk-off, and the generation of other nonlinear effects including four-wave mixing.

Figure 10:
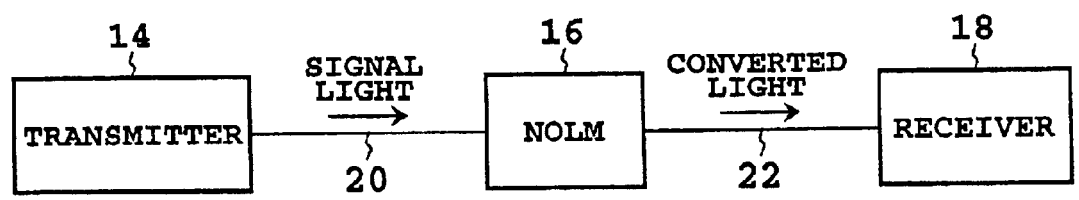
FIG. 10 is a block diagram showing a first preferred embodiment of the system according to the present invention.

FIG. 10 is a block diagram showing a first preferred embodiment of the system according to the present invention. This system is configured by connecting a transmitter 14, a NOLM 16 provided by the device according to the present invention, and a receiver 18 through optical fiber transmission lines 20 and 22. Signal light from the transmitter 14 is supplied to the NOLM 16 by the optical fiber transmission line 20. In the NOLM 16, the input signal light is converted to obtain converted light, which is in turn transmitted to the receiver 18 by the optical fiber transmission line 22.

For example, optical amplitude (intensity) modulation is adopted as a modulation method for an optical signal in the transmitter 14. In this case, direct detection can be performed in the receiver 18, for example.

Each of the optical fiber transmission lines 20 and 22 may be provided by a single-mode silica fiber, a 1.3-$\mu$m zero-dispersion fiber, or a 1.55-$\mu$m dispersion shifted fiber, for example.

By configuring the HNL-DSF used as the nonlinear optical medium of the NOLM 16 from a single-mode type and setting the mode field diameter of the HNL-DSF smaller than the mode field diameter of each of the optical fiber transmission lines 20 and 22, it is possible to obtain a nonlinear coefficient large enough to reduce the length of the HNL-DSF.

According to this system, the operation of waveform shaping according to the present invention is allowed in the NOLM 16, and an output optical signal obtained by this operation with or without wavelength conversion can be transmitted by the optical fiber transmission line 22.

Although not shown, one or more optical amplifiers may be arranged along an optical path including the optical fiber transmission lines 20 and 22. In the case that an erbium doped fiber amplifier (EDFA) is used as each optical amplifier, ASE noise is generated in each optical amplifier and it is accumulated along the optical path. Accordingly, in the system shown in FIG. 10, the SNR can be improved on the principle of waveform shaping or noise suppression in the NOLM 16 as mentioned above.

While the NOLM 16 is used as a repeater so as to be provided between the optical fiber transmission lines 20 and 22 in this preferred embodiment, the device according to the present invention may be provided inside or in the vicinity of the receiver 18, thereby allowing the improvement in receiver sensitivity.

Although not shown, the system shown in FIG. 10 may further include a dispersion compensator for compensating the dispersion of at least one of the optical fiber transmission lines 20 and 22. For example, the dispersion compensator provides a dispersion opposite in sign to the dispersion of each optical fiber transmission line. The absolute value of the dispersion of the dispersion compensator is adjusted so that the receiving condition in the receiver 18 becomes optimum. By using the dispersion compensator, the influence of chromatic dispersion generated in each optical fiber transmission line can be suppressed to thereby allow long-haul transmission.

Figure 11:
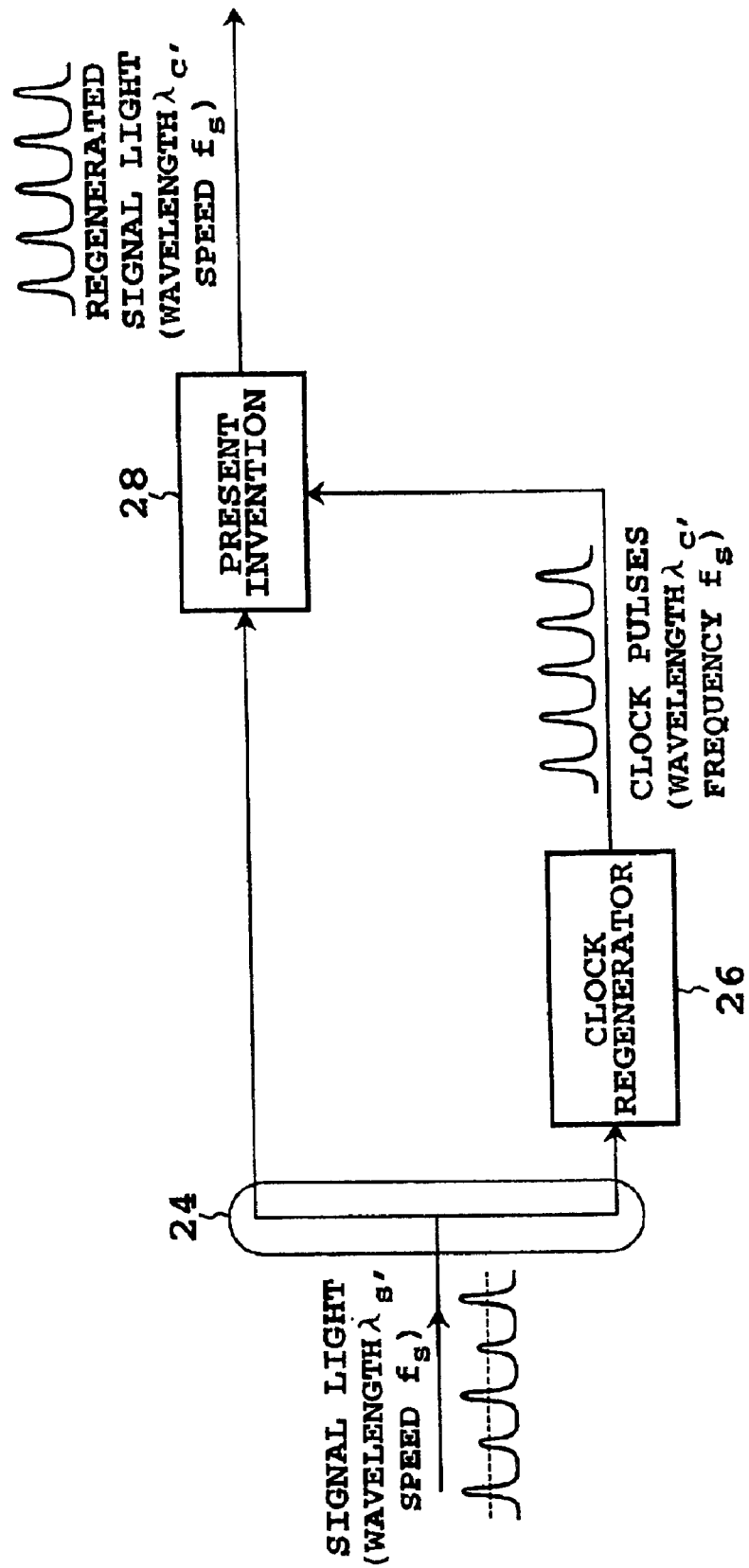
FIG. 11 is a block diagram showing a second preferred embodiment of the system according to the present invention.

FIG. 11 is a block diagram showing a second preferred embodiment of the system according to the present invention. This system includes an optical branch 24, clock regenerator 26, and a device 28 according to the present invention. Supplied to the optical branch 24 is signal light whose waveform has been distorted by dispersion or nonlinear optical effects during fiber transmission, signal light whose waveform has been perturbed by the accumulation of ASE noise in optical amplifiers during repeatered transmission using the optical amplifiers, or signal light involving the accumulation of jitter due to polarization mode dispersion or the like. The optical branch 24 branches the input signal light into first and second signal lights. The first and second signal lights are supplied to the clock regenerator 26 and the device 28 according to the present invention, respectively. The clock regenerator 26 generates clock pulses according to the first signal light supplied. In this preferred embodiment, the input signal light has a wavelength $\lambda_s$ and a speed (bit rate) $f_s$, and the clock pulses have a wavelength $\lambda_c$ and a frequency $f_s$. The clock pulses generated from the clock regenerator 26 are adjusted in timing by a timing adjuster (not shown), and next supplied to the device 28 according to the present invention.

The device 28 according to the present invention performs waveform shaping according to the second signal light and the clock pulses supplied, and outputs regenerated signal light. The regenerated signal light has the wavelength $\lambda_c$ and the speed $f_s$.

Thus according to this preferred embodiment, waveform shaping is performed by using regenerated clock pulses, thereby allowing signal regeneration including timing regeneration on the optical level. Accordingly, it is possible to provide an all-optical 3R signal regenerating device according to this preferred embodiment.

In the preferred embodiment shown in FIG. 11, the device 28 according to the present invention functions as an AND circuit for the signal having the speed $f_s$ and the clock pulses having the frequency $f_s$. By setting the frequency of the clock pulses to a value obtained by frequency divider (e.g., in the case that the signal speed is 160 Gb/s, setting the frequency to 10 GHz), demultiplexing of an OTDM (optical time division multiplexed) signal can be performed, for example.

The clock regenerator 26 may be provided by a mode-locked laser for sensing (locking in) a frequency component contained in signal light and generating clock pulses having a reference frequency from the frequency component. Alternatively, signal light having a wavelength $\lambda_s$ and a speed $f_s$ may be input into a laser continuously oscillating at a wavelength $\lambda_c$, and an optical modulator included in this laser may be subjected to amplitude modulation or frequency modulation by the signal light. Then, the optical path length of the laser may be adjusted so that the modulation frequency corresponds to the resonance period of the laser, thereby generating clock pulses having a wavelength $\lambda_c$ and a frequency $f_s$.

Figure 16:
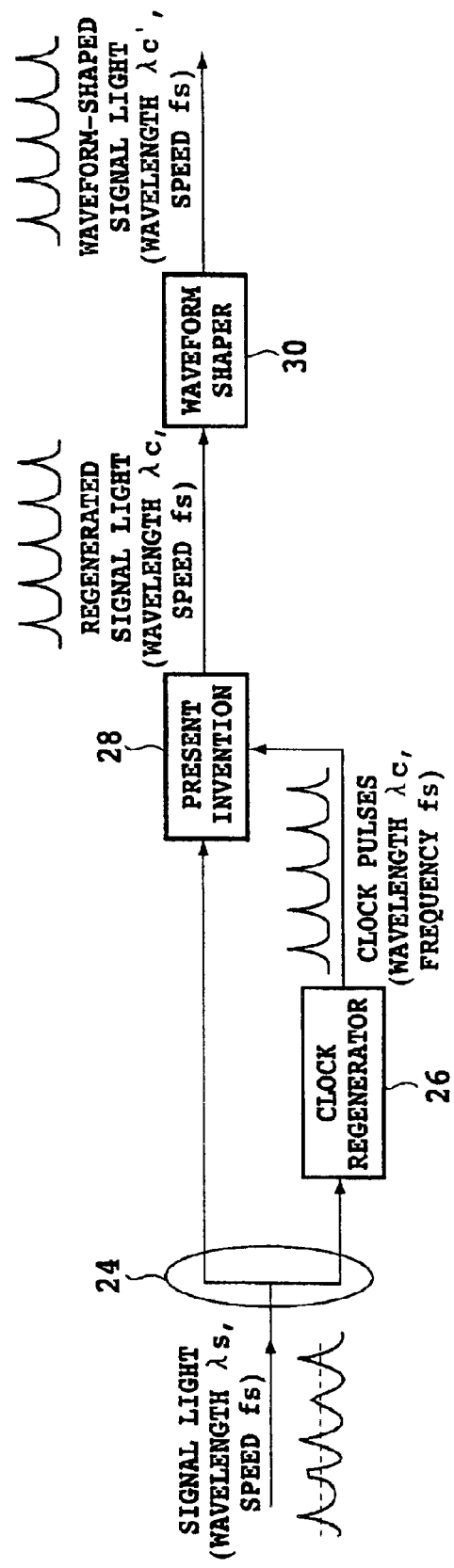
FIG. 16 is a block diagram showing an application of the preferred embodiment shown in FIG. 11.

Referring to FIG. 16, there is shown an application of the preferred embodiment shown in FIG. 11. In this application, a waveform shaper 30 is provided downstream of the device (e.g., optical AND gate) 28 according to the present invention shown in FIG. 11 to perform waveform shaping of the regenerated signal light output from the device 28. In the waveform shaper 30, the wavelength $\lambda_c$ of the regenerated signal light is converted into $\lambda_c'$ as required to output waveform-shaped signal light.

Figure 17:
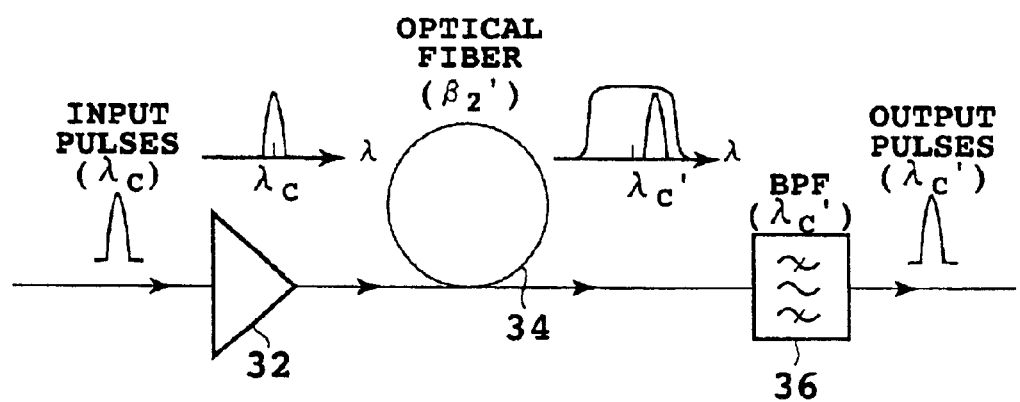
FIG. 17 is a block diagram showing a preferred embodiment of a waveform shaper shown in FIG. 16.

FIG. 17 is a block diagram showing a preferred embodiment of the waveform shaper 30 shown in FIG. 16. In this preferred embodiment, input pulses having a wavelength $\lambda_c$ by the regenerated signal light are amplified by an optical amplifier 32. The input pulses amplified are next input into an optical fiber (dispersion: $\beta_2$) 34 as a nonlinear optical medium to generate chirping. At this time, of the amplitude noise in the pulses, noise near the zero level is concentrated near the original wavelength because of small chirp, whereas noise near the pulse peak is concentrated near the longest wavelength in the broadened spectrum because of large chirp.

Accordingly, a component near a wavelength in the low-noise intermediate region is extracted by an optical bandpass filter (BPF) 36 to obtain output pulses, thereby further enhancing the effect of optical 2R regeneration.

The shape of each output pulse is determined by the passband of the optical bandpass filter 36. Accordingly, a desired pulse shape of an optical signal can be obtained by optimally designing the band characteristics of the optical bandpass filter 36. Further, by using so-called supercontinuum (SC) generating specially large chirp, wavelength conversion of the output pulses over a wide wavelength region can be performed. Additional information on these methods for waveform shaping using optical chirp are described in detail in Japanese Patent Application Nos. 2000-34454 and 2000-264757, for example.

According to the preferred embodiment as mentioned above, optical 2R and/or 3R regeneration without wavelength conversion ($\lambda_c = \lambda_c'$) can be performed.

While the waveform shaper 30 including a chirping medium is provided downstream of the device 28 according to the present invention in the preferred embodiment shown in FIGS. 16 and 17, the waveform shaper 30 may be provided upstream of the device 28 to preliminarily remove the noise before performing the optical 2R and/or 3R regeneration. Further, this method is applicable not only to the optical signal regeneration using the device according to the present invention, but also to various kinds of optical signal regeneration using an optical gate.

Figure 12:
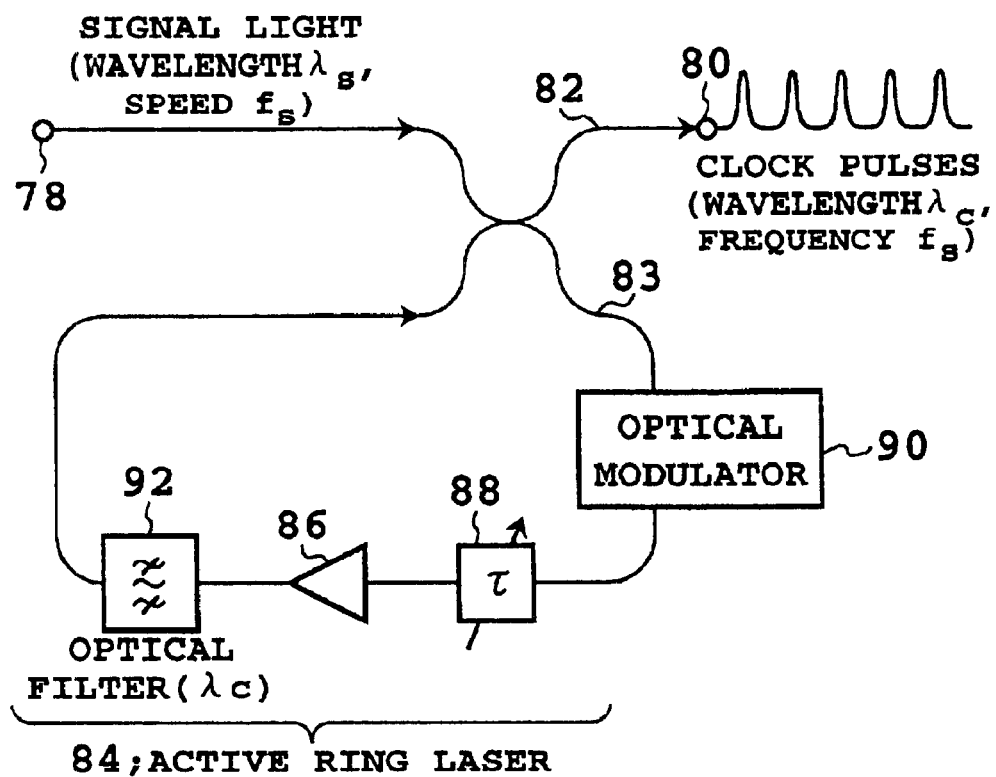
FIG. 12 is a block diagram showing a preferred embodiment of a clock regenerator shown in FIG. 11.

FIG. 12 is a block diagram showing a preferred embodiment of the clock regenerator. This clock regenerator includes an optical path 82 provided between an input port 78 and an output port 80, and an active ring laser 84 including an optical loop 83 optically coupled (e.g., directionally coupled) to the optical path 82.

Signal light having a wavelength $\lambda_s$ and a speed $f_s$ is supplied to the input port 78. The active ring laser 84 includes an optical amplifier 86 for compensating loss in the optical loop 83 so that laser oscillation occurs in the optical loop 83, an adjuster 88 for adjusting the optical path length of the optical loop 83 so that the speed (or frequency) $f_s$ becomes equal to an integral multiple of the reciprocal of a recirculation period of the optical loop 83, and an optical modulator (or nonlinear optical medium) 90 for mode-locking the laser oscillator according to the signal light. The active ring laser 84 may further include an optical bandpass filter 92 having a pass band including the wavelength $\lambda_c$ of the laser oscillation.

With this configuration, the laser oscillation of the active ring laser 84 is mode-locked, so that clock pulses having the wavelength $\lambda_c$ and the frequency $f_s$ are generated and output from the output port 80. Accordingly, clock pulses can be obtained without the need for opto/electric conversion, and it is possible to provide an all-optical clock regenerator insensitive to the speed and pulse shape of signal light.

The optical modulator 90 may be provided by an electro/optic modulator such as a $LiNbO_3$ intensity modulator and an EA (electroabsorption) modulator. Alternatively, a modulation method using second-order or third-order nonlinear optical effects or cross gain modulation may be adopted. For example, in the case of using four-wave mixing in an optical fiber, the wavelength $\lambda_s$ of signal light is set to a wavelength near the zero-dispersion wavelength of the fiber to effectively amplitude-modulate continuously oscillated light, thereby generating clock pulses. In the case of using a semiconductor optical amplifier (SOA), signal light can be used as pump light. In the case of using four-wave mixing in a DFB-LD in its oscillating state, the wavelength of signal light is set to a wavelength different from the wavelength of oscillated light in the DFB-LD, and this signal light is input with a relatively high power to induce gain saturation, thereby modulating the efficiency of four-wave mixing. Further, the continuously oscillated light can be effectively amplitude-modulated by a cross gain modulation (XGM) effect. This effect of XGM is exhibited also in the case of using four-wave mixing in an SOA, so that XGM may be positively used.

Also in the case of using second-order nonlinear optical effects, substantially the same effect can be obtained by using signal light as pump light. On the other hand, in the case of using cross phase modulation (XPM), amplitude modulation can be generated by using polarization fluctuations due to phase modulation, for example.

The device shown in FIG. 11 may be used as an all-optical 2R regenerative repeater or 3R regenerative repeater arranged along a transmission line, or may be used to improve a receiver sensitivity at a receiving end. In any case, high-quality transmission is allowed by combining this device with a repeating optical amplifier or an optical preamplifier. Further, in the case that the waveform of signal light is distorted by the dispersion or nonlinear optical effects in an optical fiber transmission line, it is effective to compensate the waveform by using a dispersion compensator or a nonlinear compensator (e.g., phase conjugator) and thereafter perform the waveform shaping or noise elimination.

Figure 13:
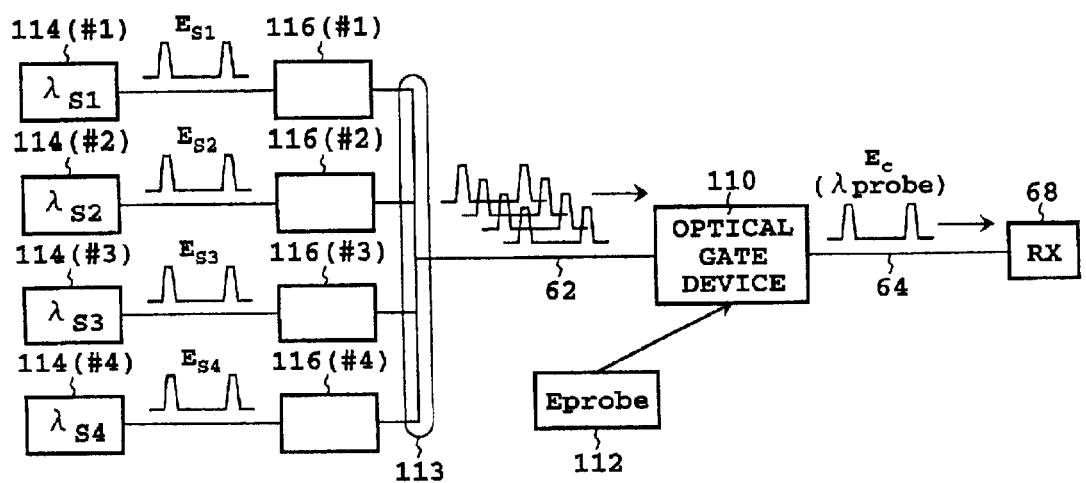
FIG. 13 is a block diagram showing a third preferred embodiment of the system according to the present invention.

FIG. 13 is a block diagram showing a third preferred embodiment of the system according to the present invention. This preferred embodiment is characterized in that WDM is specifically applied. As an optical gate device 110, the device according to the present invention may be used. Probe light Eprobe output from a probe light source 112 is supplied to the optical gate device 110.

An optical multiplexer 113 is connected to an input end of an optical fiber transmission line 62. Optical signals $E_{s1}$ to $E_{s4}$ of four channels output from optical transmitters 114(#1) to 114(#4) are adjusted in position in the time domain by optical delay circuits 116(#1) to 116(#4), respectively, and thereafter supplied to the optical multiplexer 113.

The optical signals Es1 to Es4 have different wavelengths $\lambda_{s1}$ to $\lambda_{s4}$, respectively. The optical signals $E_{s1}$ to $E_{s4}$ are obtained by intensity modulation by short pulses each having a width sufficiently shorter than data repetition time T. These optical signals $E_{s1}$ to $E_{s4}$ are sequentially shifted in time by T/4 by the optical delay circuits 116(#1) to 116(#4), respectively. Accordingly, the signal light output from the optical multiplexer 113 becomes a wavelength division multiplexed signal in which the signal pulses of all the channels do not coincide with each other in the time domain.

The wavelength division multiplexed signal output from the optical multiplexer 113 is supplied to the optical gate device 110, in which the wavelengths of all the four channels are converted into the wavelength $\lambda$ probe of the probe light. Accordingly, the converted signal light $E_c$ output from the optical gate device 110 to the optical fiber transmission line 64 is an optical time division multiplexed signal (OTDM signal).

Thus, the wavelength division multiplexed signal can be converted into the optical time division multiplexed signal (WDM/OTDM conversion) according to the system shown in FIG. 13.

While the four-channel wavelength division multiplexed signal is illustrated in this preferred embodiment, the number of WDM channels is not limited to four. For example, in the case that an N-channel wavelength division multiplexed signal (N is an integer greater than 1) is used, an N-channel optical time division multiplexed signal is obtained. In this case, N optical delay circuits are used and the time shift provided by each optical delay circuit is set to T/N.

In the preferred embodiment shown in FIG. 13, the plural optical delay circuits 116(#1) to 116(#4) are used to change each timing of the plural optical signals constituting the WDM signal light (wavelength division multiplexed signal). Accordingly, in the case of applying this configuration to an optical repeater, the optical repeater becomes complicated in configuration. This point can be improved by the following preferred embodiment.

Figure 14:
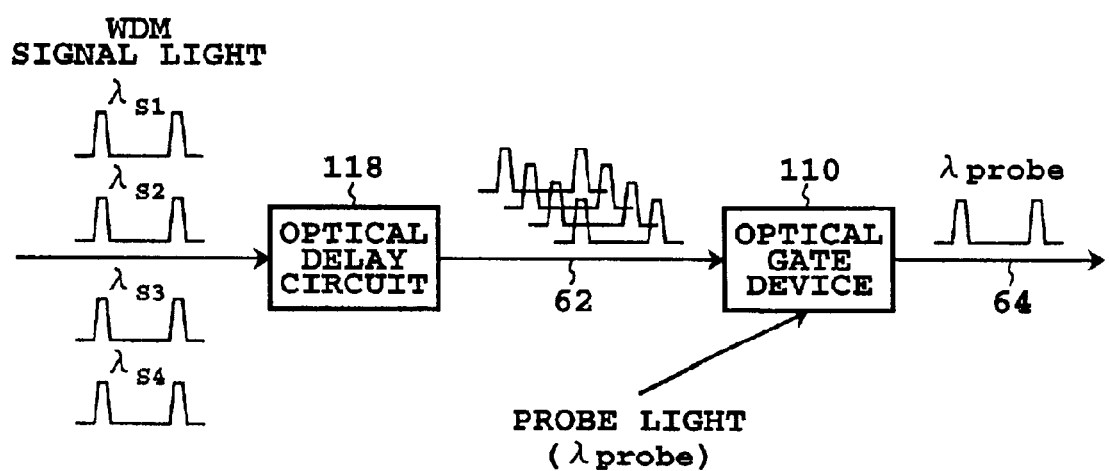
FIG. 14 is a block diagram showing a fourth preferred embodiment of the system according to the present invention.

FIG. 14 is a block diagram showing a fourth preferred embodiment of the system according to the present invention. In this preferred embodiment, a single optical delay circuit 118 is used to sequentially delay a plurality of optical signals constituting WDM signal light at a time. Thereafter, the WDM signal light output from the optical delay circuit 118 is supplied through the optical fiber transmission line 62 to the optical gate device 110. As the optical delay circuit 118, an optical medium providing chromatic dispersion may be used. For example, by using an optical fiber as the optical medium, which has a characteristic that the dispersion changes substantially linearly with wavelength, substantially linear delays can be given to a plurality of optical signals as in the case of adjusting the delay time in the plural optical delay circuits.

Thus, the single optical delay circuit is used in the system shown in FIG. 14 to simultaneously give the delays to the plural optical signals, thereby simplifying the configuration of the device to improve the reliability of the system.

According to the present invention as described above, it is possible to provide a method, device, and system for waveform shaping which can obtain sufficient 2R and/or 3R functions. Further, it is also possible to provide a method, device, and system for waveform shaping which are suitable for WDM.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method comprising:
   providing a nonlinear optical loop mirror comprising a first optical coupler including first and second optical paths directionally coupled to each other, a loop optical path including first and second fibers having different characteristics for connecting said first and second optical paths, and a second optical coupler including a third optical path directionally coupled to said loop optical path; and
   supplying probe light and input signal light from said first and third optical paths, respectively, and outputting output signal light from said second optical path, wherein
   a sign of a first dispersion to said input signal light in said first fiber is different from a sign of a second dispersion to said input signal light in said second fiber, thereby compensating for a dispersion to said input signal light; and
   a sign of a third dispersion to said probe light in said first fiber is different from a sign of a fourth dispersion to said probe light in said second fiber, thereby compensating for a dispersion to said probe light.

2. A method according to claim 1, wherein said characteristics are dispersions or dispersion slopes.

3. A method according to claim 1, wherein said characteristics are zero-dispersion wavelengths.

4. A method according to claim 1, wherein a sum of a first phase shift by cross-phase modulation in said first fiber and a second phase shift by cross-phase modulation in said second fiber is almost π.

5. A method according to claim 1, wherein said first and second fibers have dispersions opposite in sign and substantially equal in absolute value near the wavelengths of said input signal light and said probe light.

6. A method according to claim 1, wherein said first and second fibers have dispersions opposite in sign and substantially equal in absolute value near the wavelength of said input signal light.

7. A method according to claim 1, wherein each of said first and second fibers comprises a dispersion flattened fiber.

8. A method according to claim 1, wherein each of said first and second fibers comprises a photonic crystal fiber having a zero-dispersion wavelength near the wavelengths of said input signal light and said probe light.

9. A method according to claim 1, wherein said input signal light comprises WDM signal light obtained by wavelength division multiplexing a plurality of optical signals having different wavelengths.

10. A method according to claim 1, wherein said input signal light comprises pulse light, said output signal light is synchronized with said input signal light, and the wavelength of said output signal light coincides with the wavelength of said probe light.

11. A method according to claim 1, further comprising:
supplying at least one of said input signal light and said output signal light to a nonlinear optical medium to generate chirp; and
extracting a spectral component different from a center wavelength from a spectrum broadened by said chirp.

12. A device comprising:
a first optical coupler including first and second optical paths directionally coupled to each other;
a loop optical path including first and second fibers having different characteristics for connecting said first and second optical paths; and
a second optical coupler including a third optical path directionally coupled to said loop optical path;
probe light and input signal light being supplied from said first and third optical paths, wherein,
output signal light being output from said second optical path;
a sign of a first dispersion to said input signal light in said first fiber is different from a sign of a second dispersion to said input signal light in said second fiber, thereby compensating for a dispersion to said input signal light; and
a sign of a third dispersion to said probe light in said first fiber is different from a sign of a fourth dispersion to said probe light in said second fiber; thereby compensating for dispersion to said probe light.

13. A device according to claim 12, wherein said characteristics are dispersions or dispersion slopes.

14. A device according to claim 12, wherein said characteristics are zero-dispersion wavelengths.

15. A device according to claim 12, wherein the total amount of phase shifts by cross-phase modulation in said first and second fibers is almost π.

16. A device according to claim 12, wherein said first and second fibers have dispersions opposite in sign and substantially equal in absolute value near the wavelengths of said input signal light and said probe light.

17. A device according to claim 12, wherein said first and second fibers have dispersions opposite in sign and substantially equal in absolute value near the wavelength of said input signal light.

18. A device according to claim 12, wherein each of said first and second fibers comprises a dispersion flattened fiber.

19. A device according to claim 12, wherein each of said first and second fibers comprises a photonic crystal fiber having a zero-dispersion wavelength near the wavelengths of said input signal light and said probe light.

20. A device according to claim 12, wherein said input signal light comprises WDM signal light obtained by wavelength division multiplexing a plurality of optical signals having different wavelengths.

21. A device according to claim 12, wherein said input signal light comprises pulse light, said output signal light is synchronized with said input signal light, and the wavelength of said output signal light coincides with the wavelength of said probe light.

22. A system comprising:
a first optical fiber transmission line for propagating signal light;
a nonlinear optical loop mirror connected to said first optical fiber transmission line for converting said signal light into converted light; and
a second optical fiber transmission line connected to said nonlinear optical loop mirror for propagating said converted light;
said nonlinear optical loop mirror comprising:
a first optical coupler including first and second optical paths directionally coupled to each other;
a loop optical path including first and second fibers having different characteristics for connecting said first and second optical paths; and
a second optical coupler including a third optical path directionally coupled to said loop optical path;
probe light and said signal light being supplied from said first and third optical paths, respectively, wherein,
said converted light being output from said second optical path;
a sign of a first dispersion to said input signal light in said first fiber is different from a sign of a second dispersion to said input signal light in said second fiber, thereby compensating for a dispersion to said input signal light; and
a sign of a third dispersion to said probe light in said first fiber is different from a sign of a fourth dispersion to said probe light in said second fiber, thereby compensating for a dispersion to said probe light.

23. A system according to claim 22, wherein said signal light comprises WDM signal light obtained by wavelength division multiplexing a plurality of optical signals having different wavelengths.

24. A method according to claim 23, further comprising providing an optical bandpass filter having a passband set so that the wavelength of said spectral component extracted in said extracting step coincides with the wavelength of said input signal light.

* * * * *